Aug. 17, 1937.   J. F. WERDER   2,090,087
SPEED INDICATING DEVICE
Filed May 28, 1936
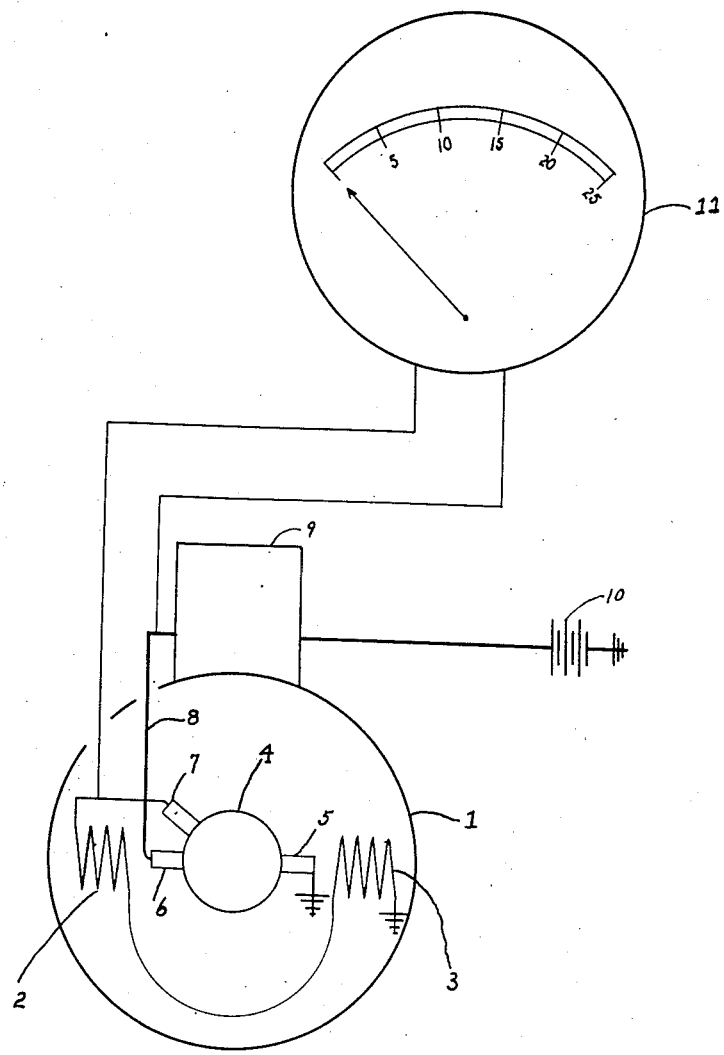
INVENTOR.
BY   John F. Werder
ATTORNEY.

Patented Aug. 17, 1937

2,090,087

UNITED STATES PATENT OFFICE 2,090,087

SPEED INDICATING DEVICE

John F. Werder, Lakewood, Ohio

Application May 28, 1936, Serial No. 82,273

3 Claims. (Cl. 175—183)

This invention relates to speed indicating devices and particularly to such devices for use on automobiles, trucks, buses and aeroplanes when the power plants of such vehicles are equipped with generators of the third brush type which supply current for charging the battery.

One object of the present invention is to make a speed indicating device which can be quickly connected to the generator of an automobile or truck engine for the purpose of obtaining comparative motor speeds before and after servicing.

Another object is to furnish an individually calibrated instrument which may be permanently connected to the generator of a particular motor for the purpose of showing the operator his engine speed within reasonable limits of accuracy.

Most generators in use today on gasoline propelled vehicles are of the third brush type. The reasons for use of this type generator are simple and clearly understood by anyone familiar with these units. However, in order that there can be no misunderstanding I shall briefly explain the principle and history of these generators.

In the early starting and lighting plants, two brush generators were employed but this type of generator increased the charging rate in proportion to the speed at which the car was driven. In order to produce sufficient current to operate the lights and starting motor the generator had to produce sufficient current to charge the battery at a rate of 10 or 15 amperes at a speed of 15 or 20 miles per hour. This was fairly satisfactory where speeds averaged around 15 to 20 miles per hour. However, when such cars were taken on long trips at higher speeds the generator output increased in proportion to the speeds so that entirely too much current was furnished. Various regulating devices were built and suggested but none of these seemed to meet with any great amount of approval until the third brush principle was developed. This type of generator usually starts charging the battery at a speed of about 600 R. P. M., reaches a maximum charging rate at a speed of 1000 to 1500 R. P. M. but when the speed is increased beyond this point the charging rate drops appreciably. On this type of generator the charging rate can be increased or decreased by altering the position of the third brush which in turn varies the amount of field excitation.

Other objects will appear from the following description and claims when considered together with the accompanying drawing.

The figure is a diagrammatic view of my device together with generator cut out and battery.

A conventional third brush type of generator is shown by numeral 1. 2 and 3 represent the shunt field windings. 4 is the commutator—5 the grounded brush and 6 and 7 the live and third brushes respectively. 8 is the wire running from the live brush to the cutout 9 and 10 is the battery. 11 is a voltmeter with dial reading changed to read in revolutions per minute instead of volts. In accordance with usual practice the two ciphers after each numeral are omitted. For example 5 means 500, 10 means 1,000, etc.

The purpose of cutout 9 is to connect the battery 10 from the generator whenever the voltage produced by the generator is sufficient to charge the battery. When the output of the generator drops to the point where the battery current flows into the generator this cutout breaks the connection.

Voltage readings taken between brushes 6 and 5 will give a fair indication of generator speeds from 0 to 500 or 600 R. P. M. At this point the output of the generator is sufficient to close cutout 9 and start charging the battery. As soon as the battery load is thrown on the generator the voltage increase is very slight. For this reason it is impossible to show any indication of high motor speeds by connecting the voltmeter at this point.

However, I have found that if a voltmeter is connected between the third brush 7 and the live brush 6 that a very accurate estimate of generator speeds can be made.

I am well aware that there is a wide variation between generator and motor speeds and they are by no means the same. That is, on one make of car the generator travels at about two and a half times crank shaft speed and on other makes of cars the generator travels at about crank shaft speed. Also the charging rate of the generator as determined by the position of the third brush will vary my readings somewhat. Nevertheless any voltmeter attached in this manner to any generator of the class described will give a very close estimate of the actual motor speeds. I find this device particularly convenient in servicing automobiles where it is convenient to be able to detect relatively slight increases in motor speeds. For example if I suspect the electrical timing on a car is not correct I can attach this meter very quickly and set the throttle so that the motor is running at a speed of approximately 1200 R. P. M. Without changing the throttle position I can advance or retard this setting and any such changes will be immediately shown on the meter either as an increase or decrease.

Likewise with the throttle set to show the same speed I find that by adding certain lubricants to the crankcase I can show an increase or decrease in speed depending upon the type of lubricant added.

Also on valve grinding jobs and others involving considerable work I can set the carburetor butterfly valve partly open by use of the adjusting screw always provided, and take readings on relative motor speeds before and after the job is completed. Even the carburetor itself can be over-hauled and reinstalled without altering position of the butterfly valve which will be accurately maintained so long as this adjusting screw is not moved during the process of overhauling the balance of the carburetor. I find it not only a convenient method of checking the work on the car to my own satisfaction but it is something that can be readily understood by the car owner that makes him feel better satisfied with the work.

I am giving examples below of the voltage readings in relation to the actual crank shaft R. P. M. taken on two different makes of cars.

| R. P. M. | Voltage |
|---|---|
| 500 | 1.4 |
| 1000 | 2.3 |
| 1500 | 3.7 |
| 2000 | 4.6 |
| 3000 | 5.4 |

| R. P. M. | Voltage |
|---|---|
| 500 | 1.1 |
| 1000 | 2.2 |
| 1500 | 3.1 |
| 2000 | 4.2 |
| 2500 | 4.5 |
| 3000 | 5.2 |

It will be seen from the above table that a voltmeter registering 0 to 5 volts will cover fairly accurately motor speeds up to about 2500 revolutions per minute. I also prefer to calibrate the dial so that it reads in revolutions in place of volts. This is done in the case of the voltmeter 11 shown on my drawing.

A voltmeter with the proper resistance, say for example, 125 ohms per volt can be permanently attached to the generator and mounted on the dash board. In this case it would be advisable to calibrate dials for particular makes of cars and in this way quite accurate readings can be given. The use of such a tachometer on buses with the motor mounted at the rear are very convenient to show the operator when he should shift gears. Considerable trouble has been encountered on such machines because the operator cannot hear his motor and he often runs it at too high a speed in low or intermediate gear.

It is also very easy to connect up a recording voltmeter in this same manner which will make a complete record of the motor speeds at all times. Such recording devices can be sealed or locked and furnish an accurate record of the way the driver has operated the vehicle.

It is understood that I do not limit my invention to the exact example herein set forth. For example some generators have more than three brushes. One has five but the principle involved is identical. On the five brush generator two brushes are grounded, two are connected to the cutout and the remaining brush is adjustable for varying the charging rate. This adjustable brush is still considered the third brush. Also my drawing shows two field windings. Most generators have four or six field windings but for purposes of illustration I have only shown two.

What I claim is:

1. The combination of an engine, a third brush type of generator driven by said engine and a speed indicating device actuated by the voltage pressure delivered between the third and ungrounded brushes of said generator.

2. The combination of a vehicle, a third brush type of generator driven by the wheels of said vehicle at a definite ratio to vehicle speed and a speed indicating device actuated by the voltage pressure delivered between the third and ungrounded brushes of said generator.

3. In a speed indicating system, a rotating shaft, a third brush type of generator having a load attached thereto, said generator being driven by said shaft through suitable means and at an approximately definite speed ratio and a speed indicating device actuated by the voltage pressure delivered between the third and ungrounded brushes of said generator.

JOHN F. WERDER.